United States Patent [19] [11] 4,352,415
Powell [45] Oct. 5, 1982

[54] BRAKES
[76] Inventor: Ralph E. Powell, Drapers Rd., Gordonvale, Queensland, Australia, 4865
[21] Appl. No.: 85,704
[22] Filed: Oct. 17, 1979
[30] Foreign Application Priority Data
Oct. 17, 1978 [AU] Australia ............................. PD6422
Apr. 27, 1979 [AU] Australia ............................. PD8563
[51] Int. Cl.³ ............................................. F16D 65/36
[52] U.S. Cl. ................................. 188/156; 188/72.2; 188/72.7; 188/72.9; 188/106 P; 188/163; 192/70.23; 192/83; 192/84 B
[58] Field of Search .................... 188/72.7, 72.2, 72.8, 188/72.9, 72.1, 106 A, 161, 163, 106 R, 156; 192/93 A, 70.23, 84 A, 84 B, 84 C, 83

[56] References Cited
U.S. PATENT DOCUMENTS

| 1,652,130 | 12/1927 | Hendrix | 188/72.8 |
| 1,906,733 | 5/1933 | Bendix | 188/72.2 X |
| 1,991,498 | 2/1935 | Dodge | 188/72.1 X |
| 2,071,107 | 2/1937 | Blatt | 188/72.8 X |
| 2,937,729 | 5/1960 | Sperri, Jr. | 192/84 C |
| 2,938,607 | 5/1960 | Kershner et al. | 188/72.8 |
| 2,968,369 | 1/1961 | Parrett | 188/72.2 X |
| 3,313,381 | 4/1967 | Harting et al. | 188/161 |

Primary Examiner—George E. A. Halvosa
Attorney, Agent, or Firm—Schwartz, Jeffery, Schwaab, Mack, Blumenthal & Koch

[57] ABSTRACT

This invention relates to a brake assembly having a brake housing and wheel shaft rotatable in the housing. There is provided an armature plate in the housing secured to and rotatable with the shaft. Also provided is a movable actuator in the housing movable rotatably from an inoperative position to an operative position closer to the armature plate. An electromagnet is provided either directly mounted to the movable actuator or indirectly via a mechanical linkage. When the electromagnet is energized it causes the actuator to rotate with the armature plate and thereby move to an operative position where it forces a stationary brake disc and rotatable brake disc into engagement to achieve a braking action. This engagement is released upon de-energization of the electromagnet.

5 Claims, 11 Drawing Figures

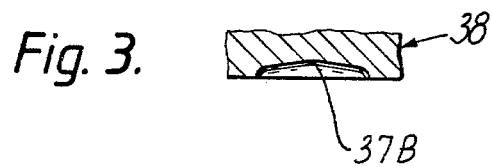
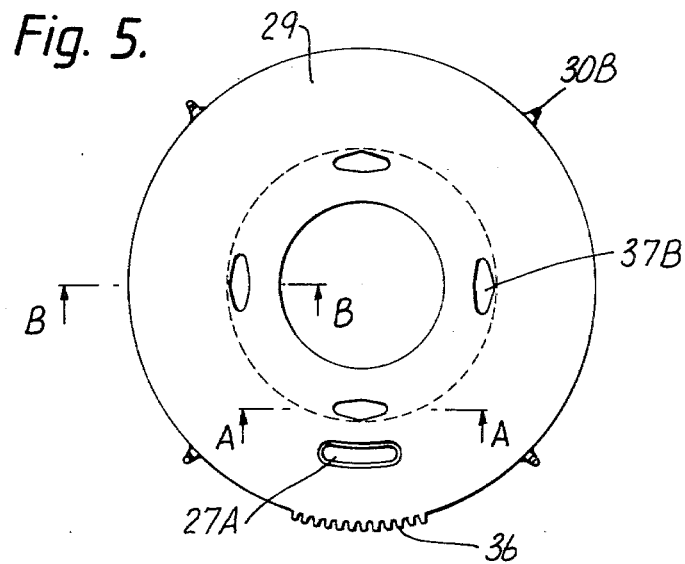
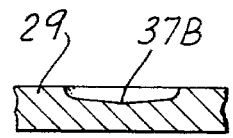

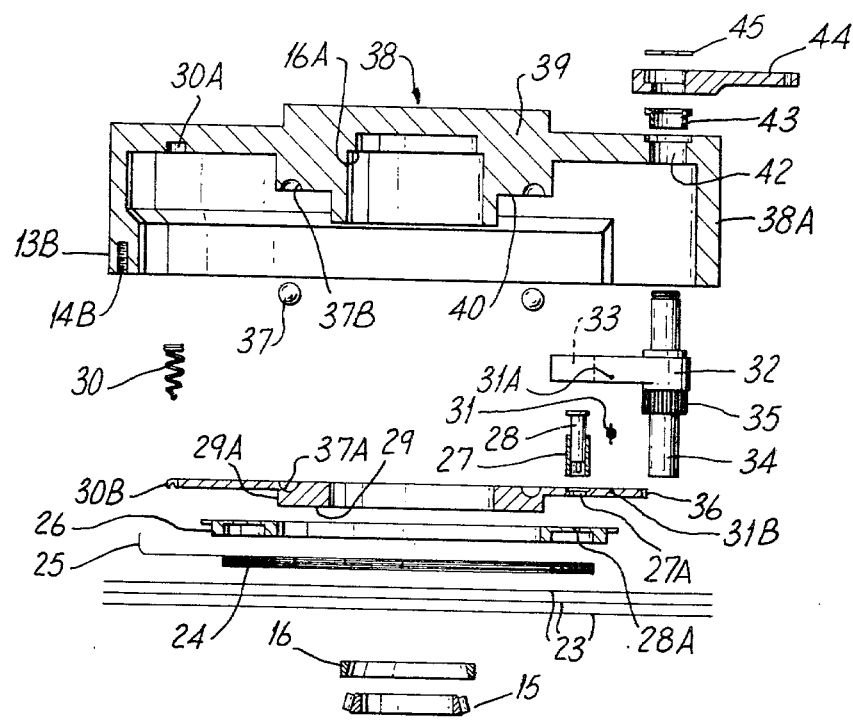
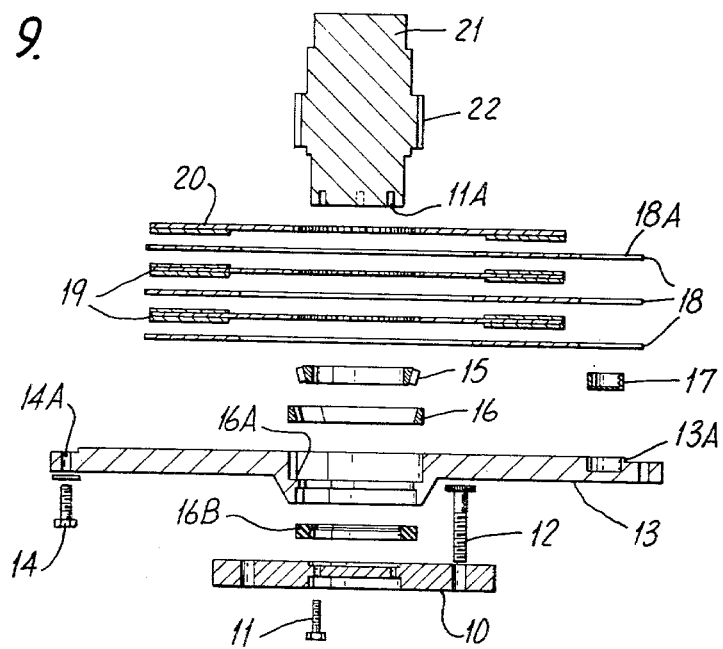
Fig. 9.

BRAKES

BACKGROUND OF THE INVENTION (1) Field of the Invention

This invention relates to improved brakes.

(2) Description of the Prior Art

Conventional disc brakes comprising opposed actuator plates, steel balls movable in inclined ramps located in adjacent faces of the opposed actuator plates, rotating brake discs and non-rotatable stationary discs operate when a brake pedal connected by a linkage to the actuator plates to rotate relative to each other, which causes the steel balls to roll on the inclined ramps and thus push the actuator plates apart. This results in clamping the two sets of brake discs (i.e. stationary and rotatable) together to give a braking action.

However such conventional disc brakes have been found to be relatively disadvantageous in relation to uneven distribution of load when the stationary brake disc and the rotatable brake disc were clamped together which caused uneven wear on the brake linings. Also conventional disc brakes as described above tend to have the friction linings on the brake discs wearing out rather quickly with a need for consequential replacement.

Also when conventional disc brakes become well used, the steel balls will tend to wear a track in the ramps, and consequently increase the likelihood of the brakes jamming. One solution adopted to overcome this problem was the provision of raised lugs designed as wear bushings. Once the actuator plates were assembled inside a housing the lugs then fitted neatly in the housing. When the actuator plates are turned, the lugs then were designed to constantly assist in keeping the plates in the correct orientation (i.e. "true" or in line). The steel balls were also supposed to assist. However, it was found when the brakes became well used that the lugs were worn down and made a groove in the housing as well as the balls making a track in the ramps. Therefore eventually the friction discs jammed. Also the actuator plates jammed because they never seemed to remain parallel to each other and geometrically at right angles to their rotational plane at the same time. Thus the balls and lugs wore down after use, and the load stress points under rotation were concentrated in too small an area.

BRIEF SUMMARY OF THE INVENTION

It is an object of the invention to provide brakes which alleviate the above-mentioned problems.

Another object of the invention is to provide brakes which are particularly well suited to trailers or caravans, but are also applicable to other vehicles, the brakes being particularly efficient, self-adjusting, and not liable to damage due to ingress of water, dust or other foreign matter.

Accordingly, the invention provides a brake assembly including a brake housing; a wheel shaft rotatable in the housing; an armature plate in the housing, secured to and rotatable with the shaft; a movable actuator in the housing movable rotatably from an inoperative position to an operative position closer to the armature plate; electromagnetic means adapted, when energised, to urge the actuator to rotate, with the armature plate, from inoperative to operative position; a rotatable brake disc in the housing, rotatable with the shaft; and a non-rotatable brake member in the housing; the actuator being adapted, when moved to operative position, to force the rotatable brake disc and the non-rotatable brake member into frictional contact to brake the rotation of the said disc and the shaft to which it is connected.

BRIEF DESCRIPTION OF THE SEVERAL VIEWS OF THE DRAWINGS

In order that exemplary embodiments will now be understood, reference is now made to the accompanying drawings, wherein:

FIG. 3 is a view along line A—A of FIG. 2;

FIG. 5 is a view of the movable actuator of the brake assembly of FIG. 1;

FIG. 6 is a view along line B—B of FIG. 5;

FIG. 7 is a view along line A—A of FIG. 5;

FIG. 9 is an exploded view of the brake assembly of FIG. 1;

DETAILED DESCRIPTION OF THE PREFERRED EMBODIMENTS

Figure 1:
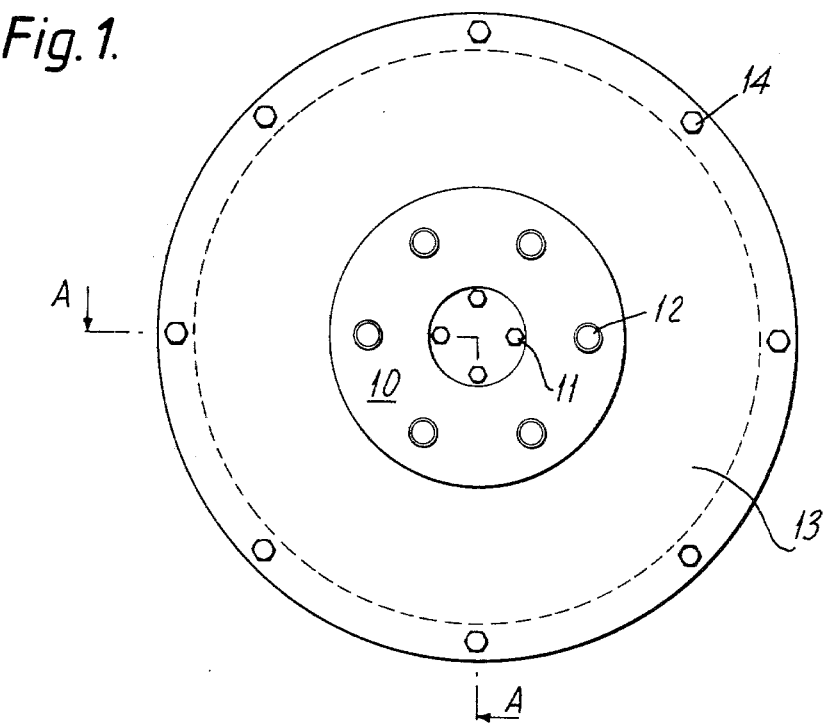
FIG. 1 is a front view of the brake assembly in accordance with the invention.
Figure 2:
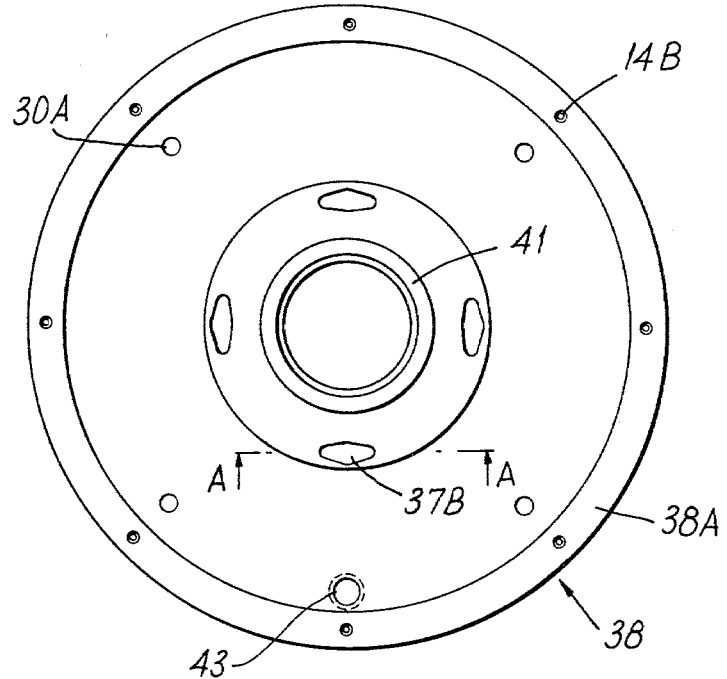
FIG. 2 is a front view of the rear housing component of the brake assembly of FIG. 1.
Figure 4:
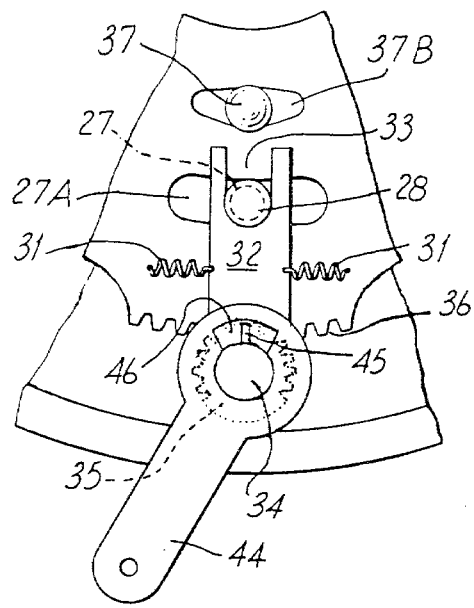
FIG. 4 is a view of the actuating mechanism of the brake assembly of FIG. 1 which moves the movable actuator from the inoperative to the operative position.

As shown in the drawings and in particular in FIG. 9, the brake assembly of the invention includes wheel hub 10 which is attached to drive shaft 21 by bolts 11. There is also provided wheel studs 12 which project outwardly through mating slots in wheel hub 10, and bolts 14 attaching cover plate 13 to the remainder of the brake housing. Bolts 14 fit through threaded holes 14A in cover plate 13.

Cover plate 13 also includes a shoulder or ledge 16A for accommodating bearing cone 16 and bearing cup 15. A seal 16B is also provided which locates on the front side of shoulder 16A as shown in FIG. 9.

Cover plate 13 may be bolted to a rear housing component 38 through bolts 14 which also engage in threaded holes 14B in component 38. In fact there is provided a peripheral flange 13A which engages with enlarged area 13B of peripheral flange 38A of rear housing component 38.

There is also provided bearing or bush 17, non-rotatable brake discs 18 which have a notch 18A to engage with a pin or appropriate part of the housing to prevent rotation, rotatable brake discs 19 having friction faces on both sides as shown, and a rotatable armature plate 20 having a frictional face or lining on its front face only as shown.

The brake assembly also includes a rotatable drive shaft 21 which is splined at 22 and threaded holes 11A for bolts 11 which interconnect shaft 21 with wheel hub 10. Another set of bearing cup 15 and bearing cone 16 is provided and also sealing gaskets 23.

There is also shown annular electromagnet 24 which is mounted in retaining plate 26. Electromagnet 24 is connected by line 25 to an appropriate source of power supply. Movable actuator plate 29 is attached to plate 26 via pin 28 which engages in bush 27. Pin 28 is welded or otherwise attached to plate 26 at dimple 28A.

Actuator plate 29 also includes rack 36, spring hole 31B, steel ball recess 37A, and spring retainer 30B. There is also shown slot 29B for bush 27 and shoulder 29A.

There is also shown lever arm 32 having pinion 35, slotted area 33, depending pin 34 and spring hole 31A whereby lever arm return spring 31 engages in both holes 31A and 31B.

Rear housing component 38 also has steel ball recess 37B, enlarged central body portion 39, peripheral flange 41, shoulder 40 and hole 30A for engaging with spring 30. There is also shown steel balls 37.

Also shown is lever 44 having a retaining cotter pin 45, and seal 43. Lever 44 fits over lever arm 32 and is retained in position by cotter pin 45. Shoulder 16A accommodates bearing cone 16.

The brake assembly housing defined by components 13 and 38 is substantially cylindrical and is fixed to an axle of a vehicle or otherwise to the vehicle's frame or chassis. Shaft 21 rotates in bearings formed by cone 16 and cup 15. A wheel (not shown) may be attached to wheel hub 10. The housing is filled with oil, and seals 16B and 43 prevent the escape of oil or ingress of dust or water. Sealing gaskets 23 may be used as adjusting shims to correctly preload the tapered bearings formed by cone 16 and cup 15. Discs 18, 19 and 20 are free to move on shaft 21 a limited distance rearwardly or frontwardly. Discs 18 cannot rotate because pin 34 engages in notch 18A.

The movable actuator plate or ring 29 and rear housing component 38 hold between them four balls 37 in equally spaced arrangement, each of the balls being partly within recess 37B in the rear housing component 38 and partly within recess 37A in the movable actuator ring 29. Each of these recesses is elongated, its major axis being substantially tangential to a circle centred on the axis of the ring, is of arcuate cross-section, and diminishes in depth from the middle to both ends. The two members 29 and 38, and their recesses, are such that when the movable ring 29 is at its median or inoperative position, each of the balls 37 is in the deeper middle parts of the two recesses 37A and 37B, and actuator ring 29 is fairly close to rear component 38; and when the movable actuator ring 29 is rotated to full extent in either direction, to either of its two operative positions, each of the balls 37 is rolled into shallow end parts of the two recesses 37A and 37B, and the actuator ring 29 is spaced furthest apart from housing component 38. The tension springs 30 interconnect the two members 29 and 38 and bias the movable ring 29 to its median or inoperative position.

The ferrous rotating armature plate 20 is made for engagement with the splines 22 of the shaft 21, and so rotatable with and slidable along the shaft.

In operation of the brake assembly as shown in FIGS. 1–9, when the brake assembly is operated by a rheostat, controller operated by a foot pedal, (or alternatively by a dyno system built into rotation of shaft 21 or any other suitable means) the electromagnet 24 is energised, further depression of the pedal increasing the amperage. The electromagnet 24, when energised, is attracted to rotating armature plate 20, and consequently torque is applied to plate 20. This in turn causes rotation of plate 26 which commences to rotate around shoulder 29A of actuator plate 29.

Bush 27 then rotates on pin 28 which is directly attached to plate 26 at 28A. The assembly of pin 28 and bush 27 then commences to rotate with plate 26 through slot 27A shown in FIG. 4. This assembly then engages with the periphery of slot 33 located in lever 32 and thus lever 32 moves which in turn causes movement of pin 34 which is integral with pinion 35. Pinion 35 then meshes with rack 36 which is integral with actuator plate 29. Plate 29 then rotates in the opposite direction to movement of pinion 35 and this causes movement of balls 37 from the inoperative to operative position as previously described. Then actuator plate 29 moves towards discs 18 and 19 causing frictional engagement between these discs. The braking effect is enhanced by the rotational movement of shaft 21.

The stationary discs 18 and rotatable discs 19 may have oil dispersal slots and holes provided in them (not shown) to assist in dispersal of oil away from the mating frictional surfaces of discs 18 and 19.

If desired the actuator plate 29 may be moved mechanically from the inoperative to the operative position and this may be achieved by movement of lever arm 44. Lever arm 44 has pin 45 attached thereto which must travel in a specified arc before engaging the periphery of slot 46 (shown in FIG. 4) and thus actuating pinion 35 which then causes movement of plate 29 as previously described. Thus the provision of lever arm 44 is useful as an emergency brake or hand brake.

Figure 10:
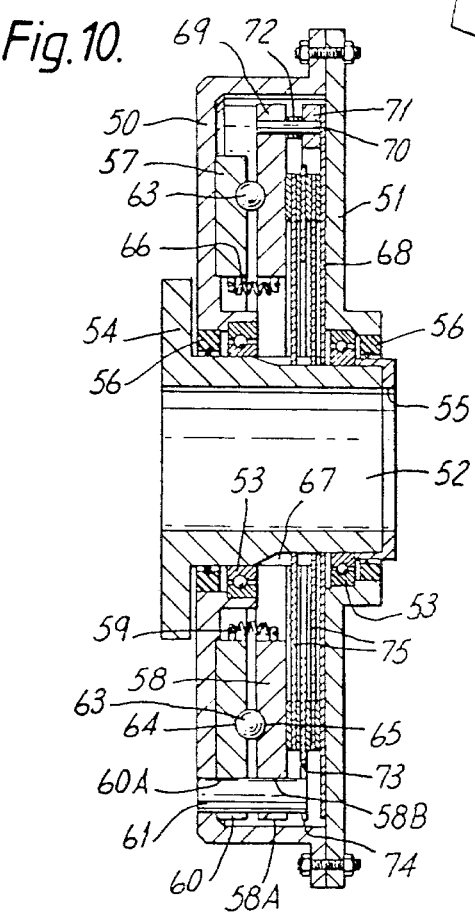
FIG. 10 is a side sectional view of a modification of the brake assembly of FIG. 8.
Figure 8:
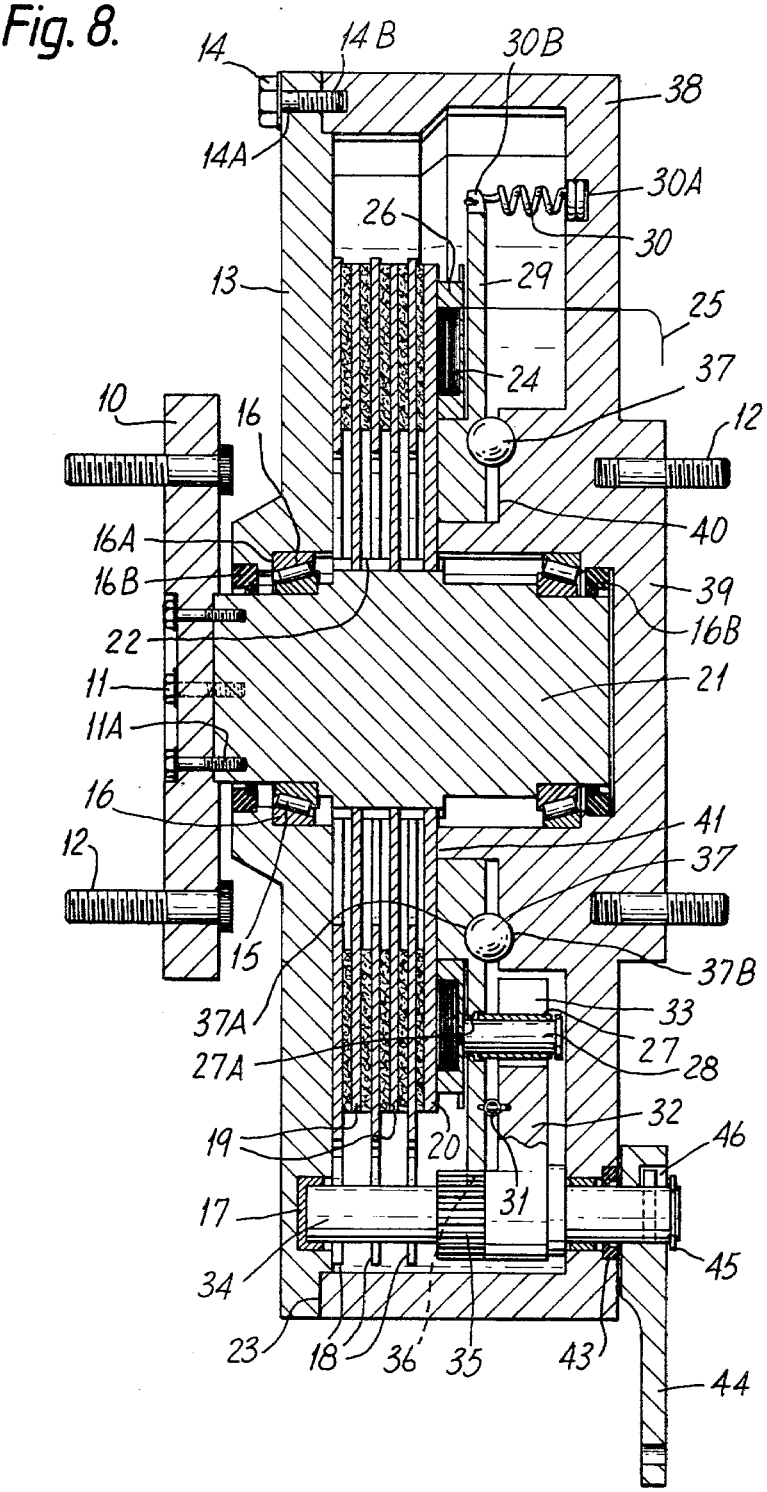
FIG. 8 is a side sectional view of the brake assembly of FIG. 1.

The brake assembly illustrated in FIG. 10 includes a substantially cylindrical housing 50, closed at its outer end, its inner end being closed by an end plate 51 bolted to a peripheral flange about the housing. This housing is fixed to an axle of the vehicle or otherwise to the vehicle's frame or chassis. A shaft 52 is rotatable coaxially in the housing, in anti-friction bearings 53 in the housing and the end plate 51, and has at its outer end an attachment flange 54 to which a wheel (not shown) may be secured, a retainer 55 bolted to the inner end preventing the disengagement of the shaft. The housing is filled with oil, and appropriate oil seals 56 are provided to prevent escape of the oil or ingress of dust or water.

Coaxially mounted within the housing are a fixed actuator ring 57 and a movable actuator ring 58. The fixed actuator ring 57 is engaged upon an annular shoulder 59 on the closed end of the housing 50 and secured by screws (not shown), and is formed with a downwardly extending lug 60 with a notch 60A which is closely engaged by a pin 61 fixed in the housing and restraining the actuator ring 57 against rotation. The movable actuator ring 58 is also formed with a downwardly extending lug 58A with a notch 58B engaged with the pin 61, but in this case the notch 58B is wider, to permit the movable actuator ring a degree of rotational movement.

The fixed and movable actuator rings 57 and 58 hold between them four balls 63 in equally spaced arrangement, each of the balls being partly within a recess 64 in the fixed actuator ring 57 and partly within a recess 65 in the movable actuator ring 58. Each recess 64 and 65 is similar to recesses 37A and 37B described previously and ring 58 moves from an inoperative position to an operative position by movement of steel balls 63 in the same manner as movable actuator 29 relative to rear housing 38 as described previously.

The shaft 52 is splined, as indicated at 67, and there is mounted on the shaft adjacent to the housing end plate 51 a ferrous rotating armature plate 68, which is made for engagement with the splines of the shaft, and so rotatable with and slidable along the shaft. The movable actuator ring 58 is formed with two diametrically opposed lugs 69 through which are secured a pair of parallel pins 70 extending towards the armature plate 68, and on each of these pins there is slidably mounted an annular electromagnet 71, a compression spring 72 on the pin between the actuator ring and the magnet urging the magnet into contact with the armature plate.

Between the movable actuator ring 58 and the armature plate 68 is an annular brake ring 73 having a downwardly extending lug 74 notched for engagement with the pin 61, which restrains this brake ring against rotation.

Two similar brake discs 75 are provided, one between the armature plate and the brake ring 73, the other between this brake ring and the movable actuator ring. Each of the brake discs 75 is engaged with the splined shaft 52 for rotation with the shaft, and is slidable along the shaft. Each of the said discs is provided on both sides with annular sintered friction faces.

The brake in FIG. 10 may be operated by a foot pedal as described previously so that, when the pedal is depressed, the electromagnets 71 are energised, further depression of the pedal increasing the amperage. The magnets, when energised, are attracted magnetically to the rotating armature plate 68, and consequently torque is applied to the movable actuator ring 58 on which the magnets are mounted. The consequent rotational movement of the movable actuator ring to an operative position results in the balls 63 being rolled to shallow ends of the fixed and movable actuator rings 57 and 58 to move the ring 58 axially away from the ring 57, and to apply pressure to the arrangement of brake discs 75 and brake ring 73 between the movable actuator ring 58 and the armature plate 68. Friction between the movable actuator ring 58 and the near brake disc 75 applies further torque to the ring 58. The braking effect therefore will be very efficient.

It will be appreciated that the braking is applied equally to rearward motion as to forward motion of the vehicle.

Figure 11:
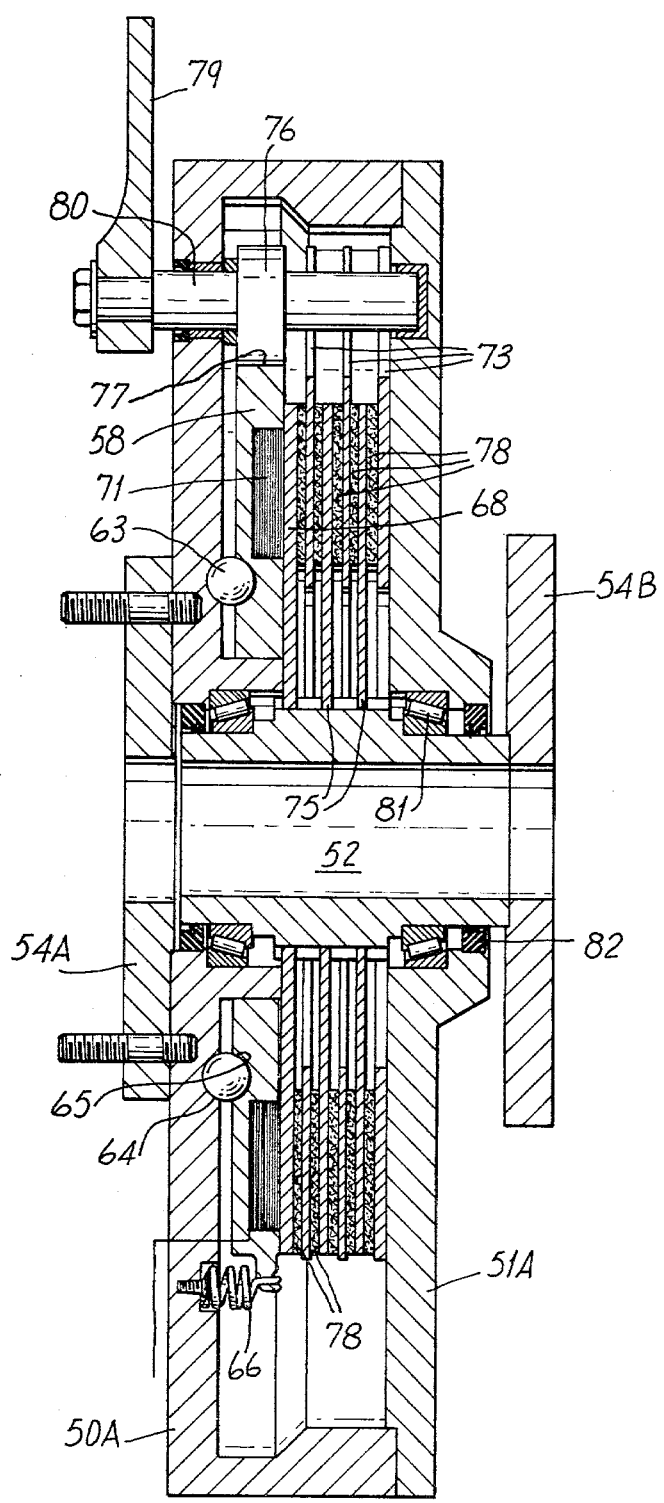
FIG. 11 is a side sectional view of another modification of the brake assembly of FIG. 8.

In a modification of the invention shown in FIG. 11 the brake housing consists of two parts 50A and 51A both similar to housing parts 50 and 51 before described in FIG. 10 but arranged and bolted together to provide a housing of greater depth. In this embodiment the inner surface of housing part 50A contains recesses 64 and is therefore the equivalent of fixed actuator ring 57 described previously which was separate from the housing. Part 50A functions with associated movable actuator ring 58 and interposed balls 63 as before described. It will be noted in FIG. 11 that the same numerals are used to designate the same members as in FIG. 10.

The rotating armature plate 68 in this embodiment is located centrally within the housing as shown and two arrangements of rotating brake disc 75 with friction faces 78 and nonrotating brake ring 73 is shown. The movable actuator ring 58 is provided with an electromagnet 71 which is a single large annular magnet coaxial with movable actuator ring 58 and secured in an annular recess therein. The brake is applied by energising magnet 71 which is in magnetic engagement with armature plate 68.

It will be noted that in the FIG. 11 embodiment the retainer 55 is dispensed with the shaft 52 being larger at the centre than at the ends. Also the attachment flange 54 has been dispensed with and replaced by a separate attachment plate 54B which is bolted to shaft 52 as shown. These changes facilitate assembly of the braking system such as from the end defined by plate 54B and one can use variable size attachment plates to suit differently sized wheels.

In FIG. 11 the cam 76 is used to work the hand-brake only. The cam can also be used to function as an emergency brake. The cam lever 79 on shaft 80 works in the same fashion as pin 61 in FIG. 10 previously described but it may be held in an appropriate position by spring tension. By connecting a suitably set trigger device to lever 79 via a cable, the cam 76 could be used to apply the brakes mechanically by the lever pulling lever 79. This is useful for safety purposes with the cam providing a mechanical back up for the electromagnet system. The cam 76 engages in notch 77 in movable actuator ring 58 so that when the lever 79 is moved by the hand brake lever (not shown) the ring 58 is turned to apply the brake. In FIG. 11 there is also shown bearings 81 and seals 82.

In comparing the respective embodiments of FIGS. 1–9, 10 and 11, it is believed the leverage advantage of FIGS. 1–9 requires less effort than through the cam method shown in FIG. 11.

In the FIGS. 1–9 embodiments, when plate 13 is bolted to rear housing 38 and the correct shims 23 are used in conjunction with tapered bearings then shaft 21 in the form of a tubular sleeve will rotate coaxially and cannot disengage. The two members 13 and 38 are bolted in such a way so as to set the correct amount of preload on the bearings (e.g. by shims which also serve as sealing gaskets). Thus the need for threads, lock nuts etc. are substantially eliminated.

Also the FIGS. 1–9 embodiments show how it is practical to mount the cover plate 13 on a suitable axle and assemble the whole brake from the front in sequence.

It will also be appreciated that shoulder 41 is useful in ensuring that ring 29 rotates equally, evenly and symmetrically and forms the correct support for pin 34 and balls 37.

The outside of the housing may be fitted with fins for cooling purposes and the interior surface may have raised fins to locate the stationary discs 18.

If desired, hydraulic or other means may be provided for turning the movable actuator ring to apply the brake.

As shown in FIGS. 1–9 shaft 21 is in the form of a tubular sleeve which allows for insertion of the sleeve over a stub axle or protruding wheel axle and thereby this allows for the attachment of the brake of the present invention to existing wheel axles.

It will be appreciated that if desired the rotatable discs and stationary discs may be provided in the central part of the brake housing and a pair of movable actuators provided bounding the assembly of rotatable and stationary discs at each end of the housing wherein the steel balls engage in their corresponding recesses between each movable actuator and each end of the housing.

Brakes according to the invention will be found to be very effective in achieving the objects for which they have been devised. It will, of course, be understood that the particular embodiments of the invention herein described by way of illustrative example only may be subject to many modifications of constructional detail and design, which will be readily apparent to persons skilled in the art, without departing from the scope and ambit of the invention.

I claim:

1. A brake assembly including:

a brake housing;

a wheel shaft rotatable in the housing;

an armature plate in the housing, secured to and rotatable with the shaft;

a movable actuator in the housing, movable axially from an inoperative position to an operative position closer to the armature plate;

an electromagnet housed in an electromagnetic housing and adapted, when energized, to rotate, and thus urge the actuator to rotate, with the armature plate, from its inoperative position to its operative position;

a lever member operatively attached to the electromagnet housing and adapted to be actuated by actuation of said electromagnet, said lever member having gear means associated therewith rotatably engaging the movable actuator;

a rotatable brake disc in the housing, rotatable with the shaft; and a non-rotatable brake member in the housing; the movable actuator being adapted, when moved by said lever to the operative position by the interengagement of the gear means with the lever member upon actuation of said electromagnetic, to force the rotatable brake disc and the nonrotatable brake member into frictional contact to brake the rotation of the said disc and the shaft to which it is connected.

2. The brake assembly as claimed in claim 1 wherein said gear means comprises a pinion integral with or otherwise attached to the lever member, and a rack located on the movable actuator, said pinion meshing with the rack to rotate said movable actuator when said electromagnet in the electromagnet housing is energized and thereby commences to rotate with the armature plate.

3. The brake assembly as claimed in claim 1 or 2 further including a pin interconnecting the electromagnet housing and said lever member, said pin being rigidly attached to the electromagnet housing and pivotally attached to said lever member.

4. The brake assembly as claimed in claim 3 wherein said pin extends through a slot in the movable actuator and is provided with a surrounding bush, and said pin engages loosely in a slot provided in the lever member, whereby upon rotation of the electromagnetic housing, the bush engages with the periphery of the slot provided in the lever member and thereby causes pivotal movement of said lever member.

5. The brake assembly as claimed in claim 4 further including springs positioned between the lever member and the movable actuator to bias the lever member to an inoperative position.

* * * * *